(12) United States Patent
Retz et al.

(10) Patent No.: US 7,614,584 B2
(45) Date of Patent: Nov. 10, 2009

(54) PILOT REST FOR AIRPLANE

(75) Inventors: Kevin M. Retz, Bothell, WA (US); Kelly L. Boren, Marysville, WA (US)

(73) Assignee: The Boeing Company, Chicago, IL (US)

(*) Notice: Subject to any disclaimer, the term of this patent is extended or adjusted under 35 U.S.C. 154(b) by 228 days.

(21) Appl. No.: 11/614,438

(22) Filed: Dec. 21, 2006

(65) Prior Publication Data

US 2008/0149765 A1 Jun. 26, 2008

(51) Int. Cl.
*B64D 11/06* (2006.01)
(52) U.S. Cl. .................................................. 244/118.6
(58) Field of Classification Search ............... 244/118.5, 244/118.6; 297/14; 5/118, 2.1
See application file for complete search history.

(56) References Cited

U.S. PATENT DOCUMENTS

| | | | |
|---|---|---|---|
| 2,396,039 A * | 3/1946 | Graves et al. ............. 244/118.1 |
| 3,898,704 A * | 8/1975 | Gallaher et al. ................. 5/2.1 |
| 5,111,626 A * | 5/1992 | Fortune ....................... 52/79.1 |
| 5,425,516 A * | 6/1995 | Daines ..................... 244/118.6 |
| 5,740,989 A * | 4/1998 | Daines ..................... 244/118.6 |
| 6,615,421 B2 * | 9/2003 | Itakura .......................... 4/664 |
| 6,676,079 B2 * | 1/2004 | Takeshima ............... 244/118.5 |
| 6,766,983 B2 * | 7/2004 | D'Alvia ................... 244/118.5 |
| 7,070,149 B2 * | 7/2006 | McDonnell .............. 244/118.5 |
| 2003/0006342 A1 * | 1/2003 | Page, Jr. .................. 244/118.5 |
| 2003/0047648 A1 | 3/2003 | Batt |
| 2005/0103935 A1 * | 5/2005 | Sprenger et al. ......... 244/118.6 |
| 2006/0113427 A1 | 6/2006 | Saint-Jalmes et al. |

* cited by examiner

*Primary Examiner*—Michael R Mansen
*Assistant Examiner*—Stephen Brookman
(74) *Attorney, Agent, or Firm*—Ostrager Chong Flaherty & Broitman P.C.

(57) ABSTRACT

A pilot rest system for use in a flight deck of an aircraft comprising a sleeping area, which comprises two parts, the first part being the space beneath one or more observer seats and the second part being a seat-free area adjacent to said seats. A curtain is preferably provided to enclose the second part of the sleeping area to ensure privacy and keep the sleep area dark if desired. The rest system can further comprise a mini-lavatory and a mini-galley in the flight deck.

17 Claims, 2 Drawing Sheets

PILOT REST FOR AIRPLANE

TECHNICAL FIELD

This disclosure relates to a rest system for use on the flight deck of an aircraft comprising a sleeping area, and may also include a mini-lavatory and/or a mini-galley. The disclosure also relates to an aircraft containing the same.

BACKGROUND

As a result of consumer needs and advances in technology, airline customers are flying extended range airplanes on long routes. Currently, no designated or purposely designed crew rest accommodations are provided on BOEING® 737® model airplanes. A typical means for providing crew rest provisions is by having them utilize an otherwise revenue generating seat in the cabin. Several disadvantages are clearly associated with this arrangement. First, the revenue potential of the utilized seat in the cabin is lost. Second, the secure door safeguarding the flight deck from the cabin has to be opened during the flight, exposing the crew members and the flight deck to possible unauthorized access. Third, typical passenger seats and even some business class and first class seats cannot be put into a lay-flat position, which is optimal for sleep. Another way for providing crew rest provisions is by creating a sleep compartment for pilots beneath or above the flight deck floor. However, such a provision is typically possible only on a large aircraft and a single aisle aircraft is unlikely to have enough space to accommodate this method.

Accordingly, there exists a need for a pilot sleep area in a flight deck, allowing at least one of the crew members to rest in a comfortable, preferably fully flat, position and reducing or entirely eliminating the need for occupying an otherwise revenue generating seat in the cabin and exposing the crew members and the flight deck to potential unauthorized access.

SUMMARY

The disclosure is directed to a pilot rest system for use in a flight deck of an aircraft comprising a sleeping area which is easily accessible. The sleeping area comprises two parts, the first part being the space beneath one or more seats (the affected seats) and the second part being a seat-free area adjacent to the affected seats. Each one of the affected seats comprises a base and back panel and the base can be rotated and folded back toward the back panel. The space under the bases of the affected seats, which is the first part of the sleeping area, is also used for providing a walking path for a person to access the sleep area. A curtain is preferably provided to enclose the second part of the sleeping area to ensure privacy, reduce noise infiltration and keep the sleep area dark if desired.

The rest system can further comprise a mini-lavatory and/or a mini-galley within the flight deck.

DETAILED DESCRIPTION

The disclosure seeks to provide a rest system for a crew member inside the secured flight deck for reasons of economy, safety and convenience.

Figure 1:
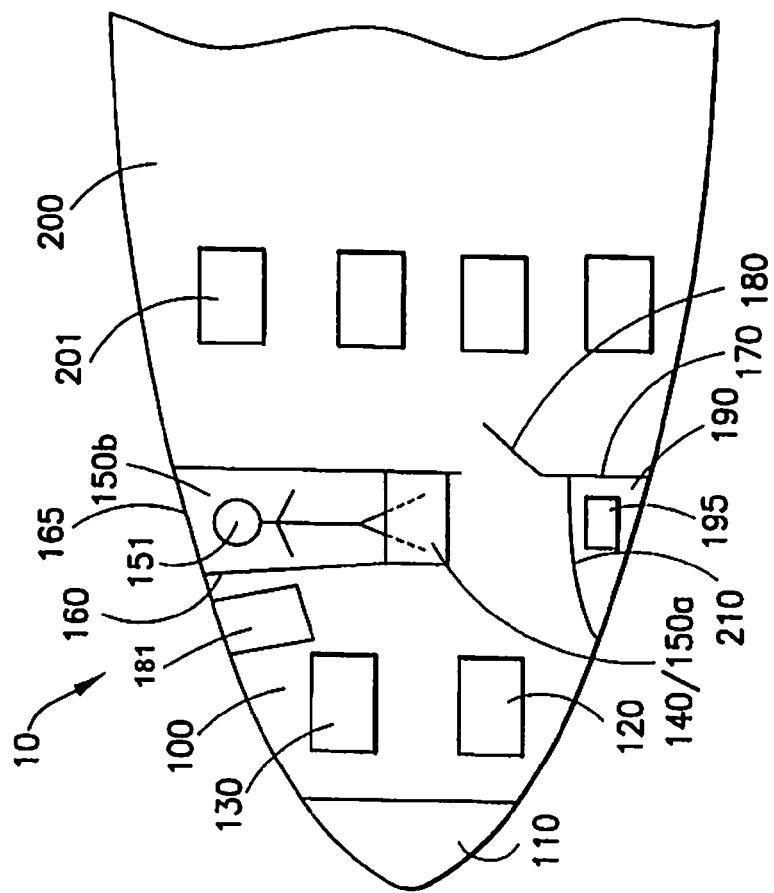
FIG. 1 is a top view of a flight deck in accordance with a preferred embodiment.

Referring to FIG. 1, a front portion 10 of an aircraft is shown comprising a flight deck 100 for crew members and a cabin 200 for passengers, separated by a secure bulkhead 170 and communicated by a door 180. The cabin contains a plurality of revenue generating seats 201. The flight deck comprises instrumentations and controls 110, one or more seats in the front row (two seats shown as an example, 120 and 130) for the pilot and first officer, and one or more seats in the back row for the 1st observer and the 2nd observer (one 1st observer seat shown as an example, 140). A sleeping area is provided comprising a first part 150a being the space underneath the seat 140 (shown as 150a and better appreciated in FIG. 2) and a second part 150b. The second part 150b is a substantially rectangular space which may be enclosed by a curtain 160 on first two sides, the bulkhead 170 on the third side and a portion of the fuselage 165 on the fourth side. When a member of the crew 151 is resting in the sleep area, one part of his/her body, preferably the upper part due to large overhead space, is in the second part of the sleep area 150b and the other part of his/her body, preferably the lower part due to limited overhead space, is in the first part of the sleep area 150a.

Figure 2:
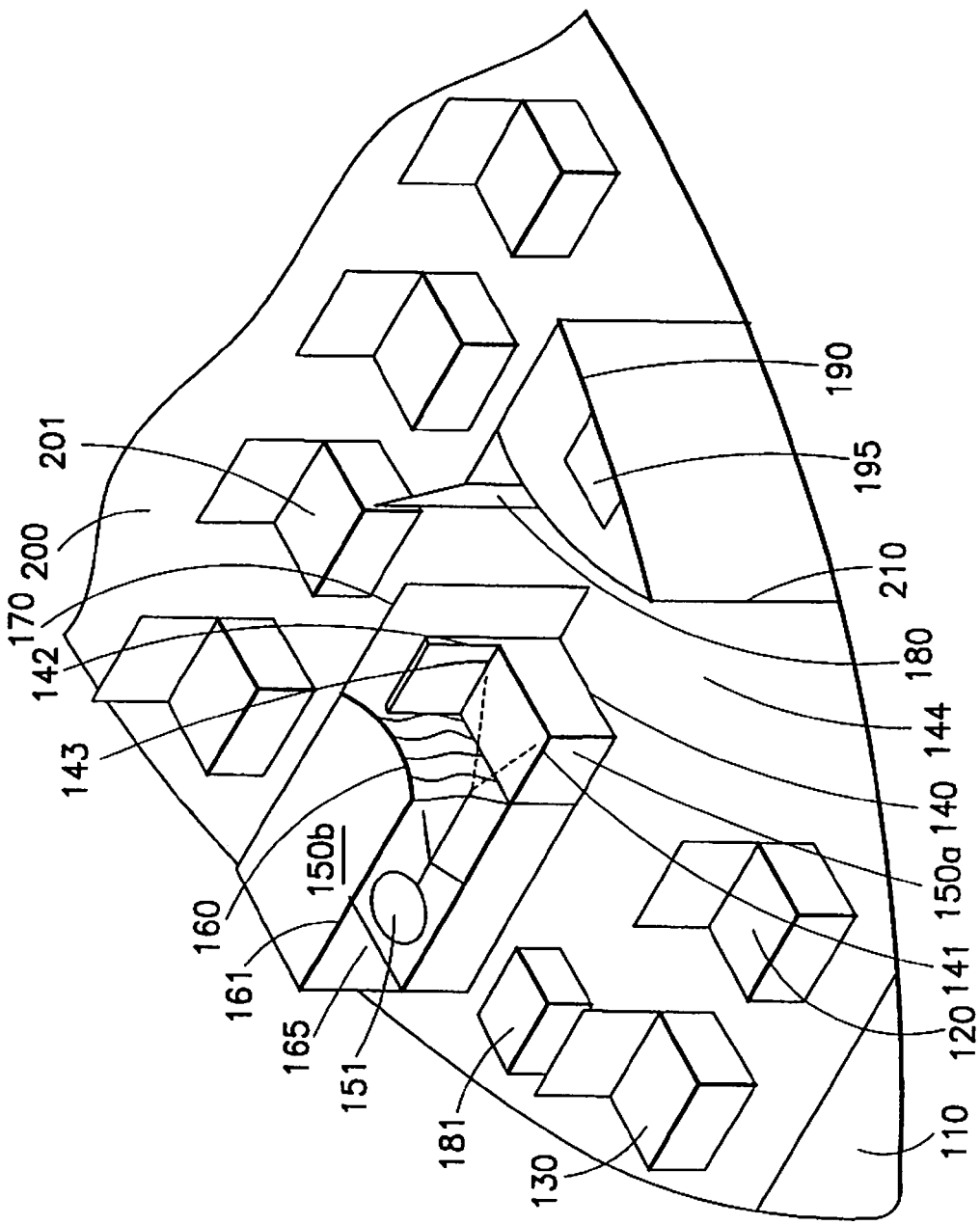
FIG. 2 is a perspective view of a flight deck in accordance with a preferred embodiment.

The relationship between the seat 140 and the first part of the sleep area 150a is better illustrated in the perspective view shown in FIG. 2. The seat 140 comprises a base 141 and a back panel 142. The floor 144 of the flight deck and the base 141 define a void therebetween which is the first part of the sleep area 150a. Preferably the base 141 can be rotatably swung upward about an axis 143 defined by the line where the base 141 meets the back panel 142. The person can enter the sleep area either through the opening to the second part of the area 150b left by a partially extended curtain 160, or through the seat 140 once the base 141 is folded upward toward the back panel 142 and locked thereto. After the person stretches his/her legs and feet into the first part of the sleep area 150a, the base can be released from the locked position and the seat is recovered. When the person desires to exit the sleep area, he/she can exit through the opening to the second part of the area 150b or again through the path created by the folded seat. A bed 165 is preferably provided inside the sleep area defined by 150a and 150b. The bed is preferably able to provide several reclination angles so that the person can lie flat if he/she desires to sleep or lie at an angle if he/she desires to read.

A curtain 160 is provided and shown in a partially retracted fashion in FIG. 2. The curtain can move along a guide rail 161 and enclose the sleep area on two sides, one side being immediately adjacent to the seat 140, the other side being opposite the bulkhead 170. When the curtain is at least partially retracted, an opening is created allowing the person to enter or exit the sleep area. When the curtain is fully extended, the sleep area can be kept dark and private.

Due to the efficient use of the floor space occupied by the seat 140, the sleep area can be accommodated on most of the commercial aircrafts, including the ones that have narrow flight decks. However, to make more room available for the sleep area, the door 180 separating the flight deck from the cabin is preferably moved off the center line of the hull. However, the door 180 may be on the center line if the aircraft has sufficient width to accommodate the sleep area. The door 180 is preferably limited to a maximum of 45° opening, so that a direct view of the flight deck from the cabin is minimized and people entering and exiting the flight deck are forced to move slower, thus safer, by following a zig-zag path.

At a suitable location, preferably behind the seat 130 and in front of the sleep area, a mini-galley 181 is provided. At another suitable location, preferably adjacent to the fuselage and on the opposite side of the sleep area, a mini-lavatory 190 is provided comprising a curtain 210 or a hard wall enclosure for privacy and a toilet and sink 195 installed in the area enclosed by the curtain 210. The provision of a mini-galley and a mini-lavatory, as a preferable feature, improves the comfort of the crew members and further reduces or eliminates the traffic between the flight deck and the cabin. The arrangement of the mini-galley, mini-lavatory, and the sleep area shown in FIGS. 1 and 2 may be changed as desired, for example, either of the sleep area and mini-lavatory may be on the port side of the aircraft.

When the pilot, 1st officer, the 1st observer or another crewmember in the flight deck needs to access the sleeping area (the sleeper), the person seated on the observer seat temporarily leaves the observer seat and folds the seat up by lifting the base of the seat and rotates the base toward the back panel, creating a path for the sleeper to walk into the sleeping area. A locking means is activated to keep the base in an up position close to the back panel when ingress or egress from the sleep area is needed. Alternatively, the sleeper can also enter the sleep area through the opening provided by a partially retracted curtain. The sleeper walks into the sleep area and lies down in a substantially stretched and flat manner with part of his/her body, preferably the legs and feet, underneath the affected observer seat. Thereafter, the persons previously seated on the affected observer seat can unlock the bases of their seats, return the bases to a down position and sit down again on the bases of the seats. The incorporation of the space underneath one or more seat base into the sleep area allows more space to be utilized for the sleep area, so that a substantially fully stretched and flat position can be accommodated on even a small airplane with a narrow flight deck.

While the disclosure has been described in connection with one or more embodiments, it will be appreciated by one of ordinary skill in the art that the specific mechanisms and techniques which have been described are merely illustrative of the principles of the disclosure and numerous modifications may be made to the methods and apparatus described without departing from the spirit and scope of the disclosure. For example and without limitation, the cockpit door may be placed on the centerline of the aircraft or off the centerline of the aircraft depending on the desired use of the cockpit space and the width of the aircraft. Further, there may be one or more observer seats having the capabilities described herein, and the placement and arrangement of the sleeping area, mini-galley and/or mini-lavatory may be easily modified to place the sleeping area on either the port or starboard side of the aircraft. All such variations and modifications are intended to be within the scope and spirit of the appended claims.

We claim:

1. A pilot rest system for use within a cockpit of an aircraft, the cockpit comprising an open interior area bounded by a front nose portion of the aircraft and an aft bulkhead extending inside the aircraft from a first side of the aircraft to a second side of the aircraft, a pilot seat and a first officer seat positioned proximate instrumentation and controls in a front portion of the open interior area for operating the aircraft and a single door positioned in the bulkhead for pilot ingress and egress to the cockpit, the bulkhead being a separating wall that is closer to the nose portion of the aircraft than any other separating wall extending between the first side and the second side inside the aircraft, the pilot rest system comprising:

at least one observer seat comprising a base and a back panel positioned within a rear portion of the open interior area of the cockpit adjacent to the bulkhead and between the single door and the first side of the aircraft, said base and a floor of the cockpit defining a void therebetween; and an unoccupied space within the rear portion of the open interior area of the cockpit positioned adjacent to the bulkhead and between the at least one observer seat and the first side of the aircraft such that the unoccupied space and the void are connected to define a sleep area inside the cockpit large enough for a person to sleep in a position substantially parallel to the bulkhead, said unoccupied space being enclosed by the first side of the aircraft, the bulkhead and a retractable curtain.

2. A pilot rest system according to claim 1, wherein said base of the at least one observer seat can be rotatably folded upward toward said back panel providing a path for egress from and ingress into said sleep area.

3. A pilot rest system according to claim 1, wherein the cockpit comprises a galley positioned within the cockpit proximate the unoccupied space and behind the first officer seat.

4. A pilot rest system according to claim 1, wherein the cockpit comprises a lavatory positioned within the cockpit.

5. A pilot rest system according claim 4, wherein the lavatory is positioned adjacent the bulkhead between the single door and the second side of the aircraft.

6. An aircraft comprising a pilot rest system according to claim 1.

7. An aircraft according to claim 6, wherein said base of the at least one observer seat can be rotatably folded upward toward said back panel providing a path for egress from and ingress into said sleep area.

8. An aircraft according to claim 6, further comprising a galley positioned within the cockpit proximate the unoccupied space and behind the first officer seat.

9. An aircraft according to claim 6, further comprising a lavatory positioned within the cockpit adjacent the bulkhead and between the single door and the second side of the aircraft.

10. A pilot rest system according to claim 1, wherein the unoccupied space extends a distance from the bulkhead that is substantially the same as a depth of the at least one observer seat.

11. A pilot rest system according to claim 1, wherein the unoccupied space is a substantially rectangular space.

12. A pilot rest system according to claim 11, wherein the retractable curtain encloses two sides of the substantially rectangular space.

13. A cockpit of an aircraft comprising:

an open interior area bounded by a front nose portion of the aircraft and an aft bulkhead extending inside the aircraft from a first side of the aircraft to a second side of the aircraft, the bulkhead being a separating wall that is closer to the nose portion of the aircraft than any other separating wall extending between the first side and the second side inside the aircraft;

a pilot seat and a first officer seat positioned proximate instrumentation and controls in a front portion of the open interior area for operating the aircraft;

a single door positioned in the bulkhead for pilot ingress and egress to the cockpit;

at least one observer seat comprising a base and a back panel positioned within a rear portion of the open interior area of the cockpit adjacent to the bulkhead between the single door and the first side of the aircraft, said base and a floor of the cockpit defining a void therebetween; and an unoccupied space within the rear portion of the open interior area of the cockpit positioned adjacent to the bulkhead and between the at least one observer seat and the first side of the aircraft such that the unoccupied space and the void are connected to define a sleep area inside the cockpit large enough for a person to sleep in a position substantially parallel to the bulkhead, said unoccupied space being enclosed by the first side of the aircraft, the bulkhead and a retractable curtain.

14. An aircraft comprising a cockpit according to claim 13.

15. A cockpit according to claim 13, further comprising a galley positioned within the cockpit proximate the unoccupied space and behind the first officer seat.

16. A cockpit according to claim 13, further comprising a lavatory positioned within the cockpit.

17. A cockpit according to claim 16, wherein the lavatory is positioned adjacent the bulkhead between the single door and the second side of the aircraft.

* * * * *